United States Patent
Hawes et al.

(10) Patent No.: US 11,288,642 B1
(45) Date of Patent: Mar. 29, 2022

(54) SYSTEMS AND METHODS FOR ONLINE PAYMENT TRANSACTIONS

(71) Applicant: United Services Automobile Association (USAA), San Antonio, TX (US)

(72) Inventors: Brian C. Hawes, San Antonio, TX (US); Justin D. Haslam, San Antonio, TX (US); Christian A. Williams, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 222 days.

(21) Appl. No.: 16/016,382

(22) Filed: Jun. 22, 2018

Related U.S. Application Data

(60) Provisional application No. 62/524,314, filed on Jun. 23, 2017.

(51) Int. Cl.
| | | |
|---|---|---|
| *G06F 16/9535* | (2019.01) | |
| *G06Q 20/08* | (2012.01) | |
| *G06F 16/955* | (2019.01) | |
| *G06F 3/04817* | (2022.01) | |

(52) U.S. Cl.
CPC ..... *G06Q 20/0855* (2013.01); *G06F 16/9535* (2019.01); *G06F 16/9566* (2019.01); *G06F 3/04817* (2013.01)

(58) Field of Classification Search
None
See application file for complete search history.

(56) References Cited

U.S. PATENT DOCUMENTS

| | | | | |
|---|---|---|---|---|
| 2006/0085478 | A1* | 4/2006 | Landau | H04L 67/02 |
| 2007/0067238 | A1* | 3/2007 | Rabson | G06Q 20/102 |
| | | | | 705/40 |
| 2008/0021920 | A1* | 1/2008 | Shapiro | G06F 16/447 |
| 2008/0133763 | A1* | 6/2008 | Clark | G06Q 10/10 |
| | | | | 709/229 |
| 2011/0289106 | A1* | 11/2011 | Rankin, Jr | G06Q 10/10 |
| | | | | 707/769 |
| 2013/0290203 | A1* | 10/2013 | Purves | G06F 16/972 |
| | | | | 705/319 |
| 2014/0052617 | A1* | 2/2014 | Chawla | G06Q 20/102 |
| | | | | 705/39 |
| 2014/0258032 | A1* | 9/2014 | Psota | G06Q 30/02 |
| | | | | 705/26.35 |

(Continued)

*Primary Examiner* — William J Jacob
(74) *Attorney, Agent, or Firm* — Fletcher Yoder, P.C.

(57) ABSTRACT

Disclosed herein are systems and methods for performing online payment transactions from any web page being accessed on a client device by automatically generating a payment application icon on the web page through which a user can make payments. The content of the web page may be analyzed to determine if the user is conducting a payment. When a payment request is identified, a payment application icon is displayed on the web page. When the user interacts with the payment application icon, a payment prompt is displayed where the user can input payment information. Upon the user providing payment information, a payment server transmit a payment to an account associated with the web page, based on the user's payment information.

20 Claims, 4 Drawing Sheets

(56) References Cited

U.S. PATENT DOCUMENTS

| | | | |
|---|---|---|---|
| 2014/0297537 A1* | 10/2014 | Kassemi | G06Q 20/02 |
| | | | 705/67 |
| 2015/0046293 A1* | 2/2015 | Izumi | G06Q 30/0635 |
| | | | 705/26.81 |
| 2015/0379615 A1* | 12/2015 | Dhar | G06Q 30/0633 |
| | | | 705/26.8 |

* cited by examiner

SYSTEMS AND METHODS FOR ONLINE PAYMENT TRANSACTIONS

CROSS-REFERENCE TO RELATED APPLICATIONS

This application claims priority to U.S. Provisional Application No. 62/524,314, filed Jun. 23, 2017, which is hereby incorporated by reference in its entirety.

TECHNICAL FIELD

The present disclosure in general relates to payment applications, and in particular relates to methods and systems for performing online payment transactions by a user from a web page being browsed by the user.

BACKGROUND

With the advent of electronic commerce, consumers can buy products or services from any merchant web store. Merchants of goods and services often enhance their business and increase clientele by accepting diverse forms of payments. For online shopping, electronic payment techniques are allowed where a business merchant is provided with information about a transfer of money before the merchant can provide the items to be delivered. For instance, when a consumer shops at a merchant's web store, after placing an order online, the consumer will also need to enter online payment information, which is normally done by filling out a payment form that requires payment card number and certain payment card supporting information. In some cases, in order to make payments for items being shopped on a merchant web store, a consumer may have to open an account with a merchant web site and provide bank account or payment card details for making any transactions on the merchant web store.

In some instances, customers are often presented with bills via an email for goods and services purchased from multiple merchants and service providers. Payment for many such goods and services may be made on a periodic basis or one-time transactions. Customers typically pay recurring bills and other bills received via an email by opening an account on merchant and service provider web sites. Customers may be required to provide bank account or payment card details while opening their account on the merchant and service provider web sites for paying the bills received via email on the merchants and service provider web sites.

Currently available online bill payment systems that require inputting financial information (e.g., bank account numbers, routing number), and in some cases, identification verifications (e.g., social security, home address) may subject the customers to an increased security risk. For instance, one potential risk occurs where user account related data (e.g., email addresses and passwords) at a merchant web site is hacked, and the hacker is able to obtain the user's financial and payment transaction data (e.g., credit card number) from the merchant web site. Another potential risk may occur where a merchant server is hacked and user's financial and personal data is stolen by hackers for possible misuse.

Furthermore, conventional payment systems require users to either remember all the payment information or obtain the payment information from another source (e.g., electronic wallet or another website, such as the user's bank website). As expected, this creates a negative user experience because users are required to have multiple browsers open. Managing these browsers, corresponding to payment information and online shopping, may be difficult, especially when dealing with smaller display screens, such as mobile devices.

SUMMARY

For the aforementioned reasons, there is a need to reduce the risk associated with online payments. There is also a need for allowing the users to conduct online shopping without being required to visit multiple online sources (e.g., multiple payment information websites, budgeting sites, and electronic wallets having payment information) and without having the burden of managing multiple browsers at the same time.

Disclosed herein are systems and methods capable of addressing the above-described shortcomings and may provide any number of additional or alternative benefits and advantages. As described herein, embodiments of the present disclosure relate to systems, apparatuses, methods, and computer program products for performing online payment transactions from any web page being accessed on a client device by automatically generating a payment application icon on the web page through which a user can make payments or retrieve additional account information. The content of a web page may be analyzed to determine if a payment application icon is needed on the web page. If the payment application icon is needed, details of a payment application icon needed for the web page is determined based on the content of the web page. A request is then issued to an executable file of a client device to generate a payment application icon on the web page, and the payment application icon generated by the executable file is displayed on the web page from which a user can make payments. Selection of the payment application icon causes a window to display to enable a payment or receive additional information.

In some embodiments, monitoring, by an application executing on a client device, a webpage displayed on a browser application of the client device by periodically executing a data scraping protocol and identifying a set of alphanumeric characters on the webpage, wherein the application is executed in a background while a user is operating the browser application of the client device; in response to a string of characters within the set of alphanumeric characters matching one or more pre-defined keywords, determining, by the client device executing the application, whether the webpage represents a payment request; and in response to determining that the webpage represents the payment request, rendering, by the client device executing the application, a payment icon on the webpage in the browser application; and in response to receiving an indication that the user has interacted with the payment icon, displaying, by the client device executing the application, a payment prompt comprising: one or more payment data input fields associated with the user, the one or more payment data input fields configured to receive payment data associated with an account of the user; and an interactive hyperlink configured to cause a payment server to transmit a payment from an account of the user to a recipient identified within the webpage, whereby the payment server transmits the payment from the account of the user to another account associated with the webpage based on payment data.

In some embodiments, a system may include a client device configured to execute an application configured to a client device configured to execute an application configured to: monitor a webpage displayed on a browser application of the client device by periodically executing a data scraping protocol and identifying a set of alphanumeric characters on the webpage, wherein the application is executed in a background while a user is operating the browser application of the client device; in response to a string of characters within the set of alphanumeric characters matching one or more pre-defined keywords, determine whether the webpage represents a payment request; and in response to determining that the webpage represents the payment request, render a payment icon on the webpage in the browser application; and in response to receiving an indication that the user has interacted with the payment icon, display a payment prompt comprising: one or more payment data input fields associated with the user, the one or more payment data input fields configured to receive payment data associated with an account of the user; and an interactive hyperlink configured to cause a payment server to transmit a payment from an account of the user to a recipient identified within the webpage, whereby the payment server transmits the payment from the account of the user to another account associated with the webpage based on payment data.

Numerous other aspects, features and benefits of the present disclosure may be made apparent from the following detailed description taken together with the drawing figures.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Figure 1:
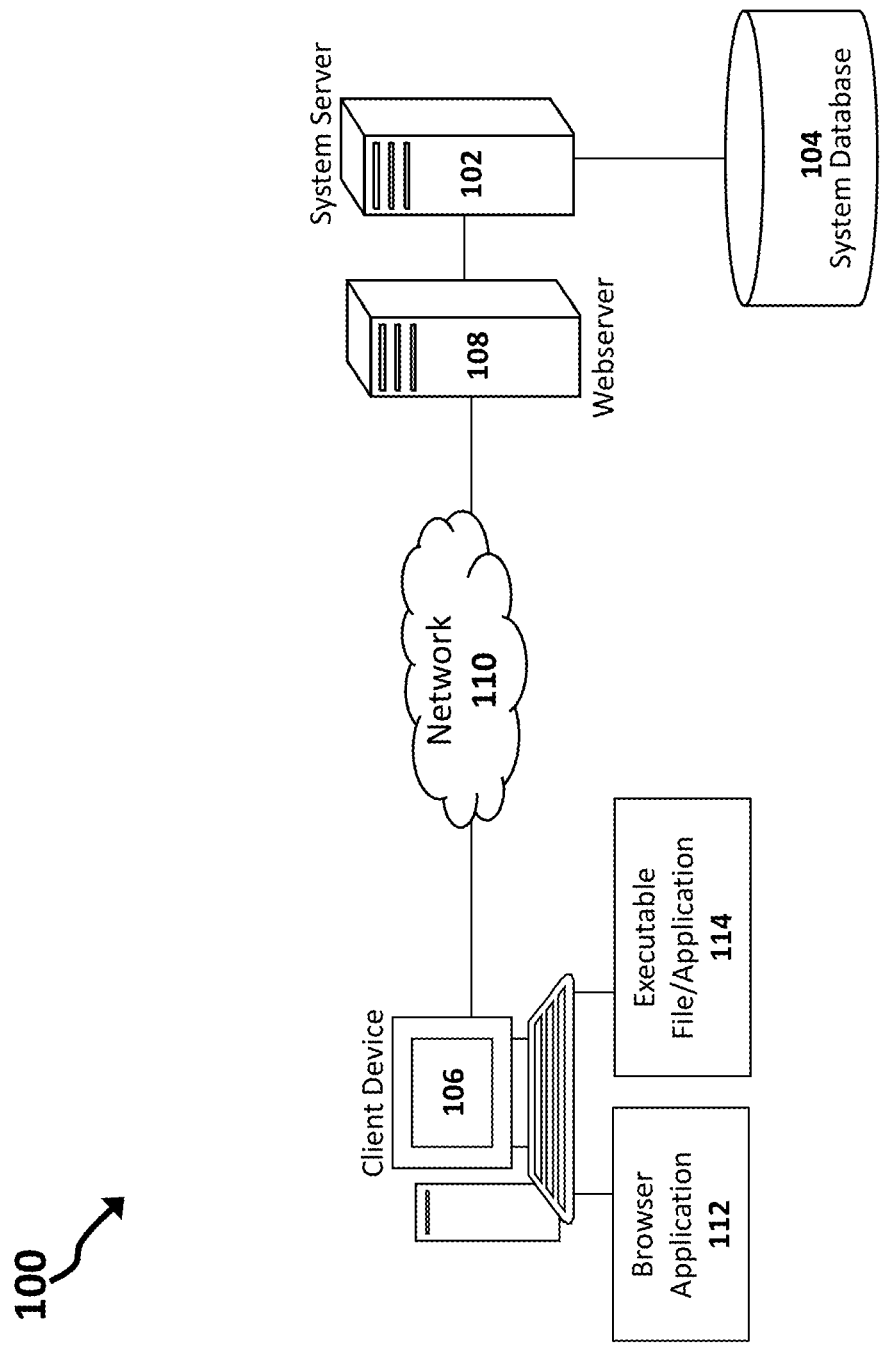
FIG. 1 shows components of an exemplary system for performing online payment transactions, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 shows components of a system 100 for performing online payment transactions, according to an exemplary embodiment. The system 100 may include system servers 102, system databases 104, client devices 106, and webservers 108. The system servers 102, the system databases 104, the client devices 106, and the webservers 108 are connected to each other through a network 110. The examples of the network 110 may include, but are not limited to, private or public LAN, WLAN, MAN, WAN, and the Internet. The network 110 may include both wired and wireless communications according to one or more standards and/or via one or more transport mediums. The communication over the network 110 may be performed in accordance with various communication protocols such as Transmission Control Protocol and Internet Protocol (TCP/IP), User Datagram Protocol (UDP), and IEEE communication protocols. In one example, the network 110 may include wireless communications according to Bluetooth specification sets, or another standard or proprietary wireless communication protocol. In another example, the network 110 may also include communications over a cellular network, including, e.g. a GSM (Global System for Mobile Communications), CDMA (Code Division Multiple Access), EDGE (Enhanced Data for Global Evolution) network.

In operation, a client device 106 may be used by a user to access a web page on a browser application 112 installed on the client device 106. The web page may correspond to a merchant's web site and/or an email web site of the user, and the web page may be hosted by a webserver 108. The webserver 108 may be any computing device hosting any merchant's web site and/or an email web site of the user accessible to the client devices 106 via the network 110. Upon the opening of the web page, the browser application 112 on the client device 106 having an executable file 114 (hereinafter also referred as an application and/or executable file) may track the user activity on the web page. The executable file 114 may query a system server 102 and/or a system database 104 and obtains an identity of the user of the client device 106 and identification data of the web page being browsed by the user from the system server 102 and/or the system database 104. The executable file 114 analyzes the content on the web page, and the executable file 114 upon determining that the browser application 112 on the client device 106 has loaded a web page having a field for a payment transaction, the executable file 114 generates a payment application icon adjacent to the payment transaction filed on the web page being accessed on the client device 106. The executable file 114 may identify a payment transaction field on the web page opened on the client device 106 by identifying a HTML code of the particular web page, using web scraping, or recognizing the URL of the web page that presents such a payment transaction field. The user of the client device 106 may select the payment application icon on the web page being accessed on the client device 106, and upon the selection of the payment application icon, the executable file 114 presents a payment application in a pop-up window, a drop-down menu, or other presentation on the web page being accessed on the client device 106. The executable file 114 may auto-import payment data, such as payee and issue payment information, in the payment application based upon the payment transaction field content identified on the web page using web scraping or any suitable scraping technique. In some embodiments, a user has an account with a payment company being represented by a payment application icon, and can perform a payment transaction via the payment application viewable on the web page opened on the client device 106 without navigating from the web page. In some embodiments, a payment application viewable on the web page opened on the client device 106 is user's bank bill payment application.

A client device 106 may be any portable or non-portable device, such as a desktop computer, laptop computer, tablet computer, smart phone, smart watch, gaming console, personal digital assistant, and the like. The client device 106 may be a computer with a processor/microcontroller and/or any other electronic component that performs one or more operations according to one or more programming instructions. The client device 106 may be capable of communicating with a system server 102 and a webserver 108 through the communications network 110 using wired or wireless communication capabilities. Although the client device 106 is depicted as a single computer, the system 100 may comprise a plurality of client devices 106.

The client device 106 may include one or more input/output devices to allow user interaction with one or more web pages and/or programs of the system server 102 and/or the webserver 108 to assist users perform online purchases and payment transactions on the one or more web pages. In one example, the client device 106 may execute a browser application 112 (also known as a web browser) that accesses and presents a web application executed by the webserver 108 or another device and allows a user to select one or more items/products sold by a business merchant. Examples of the browser application 112 may include, but are not limited to, Mozilla Firefox®, Microsoft® Internet Explorer, Google® Chrome, and Apple Safari®. The term "online," as used herein, refers to activities that occur over the network 110, including, but not limited to, accessing a merchant's web site, social network sites, etc.

The client device 106 may be configured to track online web activity of the user. For instance, when the user performs an online web activity on a browser of the client device 106, a browser application 112 may track the user activity via an executable file 114 installed on the browser application 112. The browser application 112 may include a browser plugin and/or a browser extension. The browser application 112 of the client device 106 may execute the executable file 114. The executable file 114 of the browser application 112 may track the online web activity of the user based on at least one of the Uniform Resource Locator (URL) of the web site being accessed by the user, the content of a web page of the web site being accessed, and a search query for assisting online web activity. While the example described herein recites the browser application 112 having an executable file 114, it is intended that the systems and methods can be integrated on a different application (e.g., a social networking application) that uses the functionality of the executable file 114. In an alternative embodiment, for example on a mobile client device, the functionality of the executable file 114 may be executed by a separate application. The executable file may be an extension, plug-in, or add-on. In some embodiments, users operating the client device 106 are provided with capability to install application provided browser plugins.

In some embodiments, executable files 114 may be software components that may extend or enhance functionality supported by a browser software application 112 on the client device 106. Third party developers such as a payment company/bank may independently develop an executable file 114. Further, an executable file 114 may be loaded at runtime of the client device 106. In some embodiments, an executable file 114 may indicate that the executable file 114 handles certain content types through exposed file information. If the browser software application 112 of the client device 106 encounters such content type, the browser software application 112 of the client device 106 may load the associated executable file 114. In some embodiments, the browser software application 112 of the client device 106 may set aside space within the browser content for the executable file 114 to render itself and stream data accessed by the user to it. The executable file 114 may then be responsible for rendering the user accessed data.

A wide variety of types of executable files 114 may be provided that support various types of functionality. For example, a plugin for a web browser software application 112 of the client device 106 may provide the web browser software application 112 on the client device 106 with capabilities that the web browser software application 112 on the client device 106 may not otherwise be able to support such as the ability to present a payment application to a user. In another example, a plugin for a web browser application 112 may expose one or more application programming interfaces (APIs) of a payment application to the web browser application 112 on the client device 106 to enable the browser application 112 to support functionality similar to that supported by the payment application. A web browser plugin may also augment or facilitate digital rights management between the web browser application 112 on the client device 106 and a payment application. For example, if a payment application requires a user to log in and verify identity, the plugin may allow the web browser application 112 on the client device 106 to access the authentication credentials used by the payment application to avoid the user having to sign in again separately from the payment application.

The executable file 114 installed on the browser application 112 may obtain an identity of the user operating the client device 106 and identification data of the web page being accessed by the user operating the client device 106. In some embodiments, the executable file 114 may obtain the identity of the user of the client device 106 by using a stored profile, cookies, IP address, request for input of an identification of the user from a system database 104 and/or a system server 102, or other identification method. In some embodiments, the executable file 114 may obtain the identification of the web page being accessed by the user on the client device 106 using a domain name, URL, or other identification method.

The executable file 114 may parse the web page being accessed by the user on the client device 106. The executable file 114 parses the web page to determine whether any payment transaction information is being displayed. The executable file 114 determines the payment transaction information by using keyword searches or alphanumerical character (sometimes referred to as characters) searches on the web page to find one or more of a plurality of keywords or characters that are pre-determined and known purchase keywords/characters. In some embodiments, the executable file 114 may determine the payment transaction information based on specific URL information for the web page being accessed by the user on the client device 106. For instance, when a user accesses the merchant web site, the executable file 114 may determine that the user accesses the merchant web site for performing payment transactions. The executable file 114 may learn from user browsing history, and compare URL information of the web page currently being accessed by the user with stored browsing history of the user to determine if any payment transaction information may be present on the web page currently being accessed by the user. In some embodiments, an executable file 114 may record name and location of one or more purchase keywords on the web sites accessed by the user and stored in the browsing history of the user.

In some embodiments, an executable file 114 may identify at least one known keyword on the web page being accessed by the user to identify the presence of any payment transaction information on the web page. The executable file 114 identifies any of the known keyword on the web page by identifying a HTML code of the particular web page, using web scraping, or recognizing the URL of the web page as one that presents such a known keyword. The at least one known keyword has one or more corresponding descriptors that define a transaction. In an example, an executable file 114 may select the at least one known keyword from a group consisting of total, subtotal, order total, product total, total amount, final amount, total balance, and current balance. The executable file 114 upon identifying any of the known keyword on the web page being accessed by the user may then determine a numerical data string such as a payment value associated to the identified known keyword. To determine if a payment amount is present associated to the identified known keyword, a web page is checked by the executable file 114 for characters such a dollar sign ("$") and/or a decimal point ("."). In one embodiment, although a dollar sign ($) may be typically present and determined by an executable file 114, it is not always included in a payment amount. In another embodiment, if a dollar sign ($) is present and determined by an executable file 114, the web page may have a payment amount. Upon identification of the dollar sign ($) on the web page by an executable file 114, a decimal point (.) is determined by an executable file 114. If a decimal point (.) is found without a dollar sign ($) by an executable file 114, it may not be considered to be a potential payment amount. However, if the dollar sign ($) and the decimal point (.) are found together by an executable file 114, it is considered to be a potential payment amount by an executable file 114.

In some embodiments, an executable file 114 may first determine characters such a dollar sign ("$") and/or a decimal point (".") on the web page accessed by the user to identify any payment amount is there or not on the web page. After a payment amount is found on the web page by an executable file 114 based on identification of at least one character such as such a dollar sign ("$") and/or a decimal point ("."), a determination is then made by the executable file 114 as to what type of payment amount has been found. The determination of what type of the payment amount has been found is made by an executable file 114 by identifying the at least one known keyword selected from a group consisting of total, subtotal, order total, product total, total amount, final amount, total balance, and current balance adjacent and/or in proximity to a location of payment amount on the web page being accessed by the user. In some configurations, the payment icon may be displayed in any other part of the webpage. Further, the position of the icon may be adjusted and customized by the user.

Upon determining that the browser application 112 has loaded a web page having a payment transaction field/payment amount value, the executable file 114 generates a payment application icon adjacent to the payment amount. In one instance, a payment application icon is of a payment company/bank web site where a user has an account. In another instance, a transaction page of a payment company/bank web site may be represented on a web page by a small payment application icon. For example, in a web page opened on the client device 106, a payment application icon may appear adjacent to a payment transaction field/payment amount value, in which the user may access a corresponding payment web site by clicking on the payment application icon.

When a payment application icon is displayed on a web page opened on the client device 106, the user can precisely point to and click on the payment application icon using a mouse, track pad, stylus, touchscreen, or other selection mechanism. When the payment application icon is displayed on a client device 106 with a small screen (e.g., mobile device), the payment application icon may be greatly reduced in size. In addition, for a client device 106 comprising a touchscreen, the user may have to click on a payment application icon using a finger on the touchscreen of the client device 106.

The executable file 114 displays a payment application on a web page being accessed on the client device 106 on selection of the payment application icon by a user on the web page being accessed on the client device 106. The executable file 114 displays a payment application representing a payment company web site on the web page being accessed on the client device 106 as a pop-up window, a new window, or any other visually perceptible format. In the examples shown herein, the window is a pop-up window that appears in front of the current browser window. In some embodiments, a payment application presents a payment data field such as a payment amount identified by the executable file 114 from the web page being accessed on the client device 106 to be paid by the customer. In some embodiments, a payment application presents a data field such as a list of previously purchased products, a list of recommended products, a list of membership points, and a list of reward purchase options associated to the web page being accessed on the client device 106 and stored in a user profile. In some embodiments, a payment application presents a payment data field such as a budget amount selected by a user associated to the web page being accessed on the client device 106 and stored in a user profile. In some embodiments, a payment application presents a payment data field such as a budget amount selected by a user and stored in a user profile associated to the payment company/bank stored within a database 104. For example, a user may select budget amount for each day or for each merchant web site to be stored in a user profile within a database 104 that is accessible by an executable file 114. The executable file 114 may check records of the user profile store in a database 104 prior to displaying any content in the payment application on a web page of the client device 106. The executable file 114 upon determining from the database 104 that the user profile contains any information regarding a web page being accessed currently by the user or based on any other user rules, the executable file 114 may then transmit a message to the user via the payment application.

In some embodiments, an executable file 114 may execute various web crawlers to browse various email accounts associated with user to identify various accounts and membership clubs of a user such as mobile subscriber account, cable TV subscriber account, etc. in order to index various keywords associated to payment transaction fields within these various accounts and membership clubs, and store it in a user profile within a web browser of the client device 106 and/or the system database 104. In some embodiments, an executable file 114 may execute various web crawlers to browse various web sites associated with user membership clubs, banks, merchants, loyalty programs, sites, etc., in order to index various keywords associated to payment transaction fields and store it in a user profile within a web browser of the client device 106 and/or the system database 104. The various web sites associated with user membership clubs, banks, merchants, loyalty programs, and sites may be stored in a system database 104. Any data such as various keywords identified that are associated to the payment transaction fields transmitted over the communications network 110, for example, from the client device 106 to a user profile in the system database 104 may be formatted in accordance with a variety of different communications protocols. For example, all or a portion of the network 110 may be a packet-based, Internet Protocol (IP) network that communicates data from the client device 106 to the database 104 in Transmission Control Protocol/Internet Protocol (TCP/IP) packets. In some embodiments, the user browsing history and/or prior purchasing data at one or more business merchants determined by the executable file 114 may be formatted by the client device 106 and is transmitted to the system database 104.

System servers 102 may be any computing device comprising a processor and non-transitory machine-readable storage medium and capable of performing the various tasks and processes described herein during execution. Non-limiting examples of the system server 102 may include a desktop computer, a server computer, a laptop computer, a tablet computer, and the like. For ease of explanation, FIG. 1 shows a single computing device functioning as the system server 102. However, it should be appreciated that some embodiments may comprise any number of computing devices capable of performing the various tasks described herein. A system server 102 may communicate with the client device 106 via a network 110. The system server 102 may be configured to generate a user profile based on inputs provided by a user. The inputs may include user name, user bank accounts, user preferences for different merchant web sites, and any other details provided by the user pertaining to user accounts with a payment company. The system server 102 may store a record of the user profile in a system database 104 and the user profile record in a system database 104 may be accessible to an executable file 114 installed on the client device 106.

Although the system database 104 and the system server 102 are illustrated as separate components in the system 100 of FIG. 1, in other examples, the components are combined or each is distributed amongst more than one device. In one example, the system server 102 stores the system database 104 and control the system database 104 to periodically retrieve user browsing data from the client device 106 over the communications network 110. In another example, the system database 104 may be distributed among a number of separate devices, e.g. a number of database servers, and the system server 102 includes a number of co-located or distributed servers configured to operate and/or in cooperation with one another and with the various devices comprising the system database 104.

A webserver 108 may be any computing device hosting a web site accessible to the client devices 106 via the Internet. The webserver 108 may be any computing device comprising a processor and non-transitory machine-readable storage capable of executing the various tasks and processes described herein. Non-limiting examples of such computing devices may include workstation computers, laptop computers, server computers, laptop computers, and the like. While the system 100 includes a single webserver 108, one having skill in the art would appreciate that in some embodiments the webserver 108 may include any number of computing devices operating in a distributed computing environment.

The webserver 108 may execute software applications configured to host a web site (e.g., Apache®, Microsoft IIS®), which may generate and serve various web pages to client devices 106. The web site may be used to generate and access data stored on a merchant database (which may be a separate database or a component of a system database 104). In some implementations, the webserver 108 may be configured to require user authentication based upon a set of user authorization credentials (e.g., username, password, biometrics, cryptographic certificate). In such implementations, the webserver 108 may access a merchant database configured to store user credentials, which the webserver 108 may be configured to reference in order to determine whether a set of entered credentials purportedly authenticating the user match an appropriate set of credentials that identify and authenticate the user. Upon authenticating the user, the webserver 108 which may be a merchant or other entity, generates content for display on a browser application 112 of the client device 106 such that the client device 106 can conduct a transaction (e.g., pay for a product or service) offered by the webserver 108.

System databases 104 are capable of storing user profile containing user browsing history and/or user financial data. The databases 104 may be in communication with a processor of the system server 102 and/or the client device 106, where the processor is capable of executing the various commands of the system 100. In some embodiments, the databases 104 may be part of the system server 102 or the client device 106. In some embodiments, the databases 104 may be a separate component in communication with the system server 102 and/or the client device 106.

The database 104 may be hosted on any number of computing devices comprising a non-transitory machine-readable storage medium and capable of performing the various tasks described herein. As shown in FIG. 1, the system database 104 may be accessed by the system server 102, the client device 106, and/or other servers/devices of the system 100 via one or more networks 110. The database 104 may be hosted on the same physical computing device functioning as the system server 102 and/or the client device 106. In some embodiments, the database 104 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the system server 102, the client device 106 and/or components of the system 100.

In operation, system server 102 may functionally control the application or executable file 114 that is installed and executing on the client device 106. Therefore, all execution steps performed by the server 102 may be partially or fully performed by the application 114 and vice versa.

Figure 2:
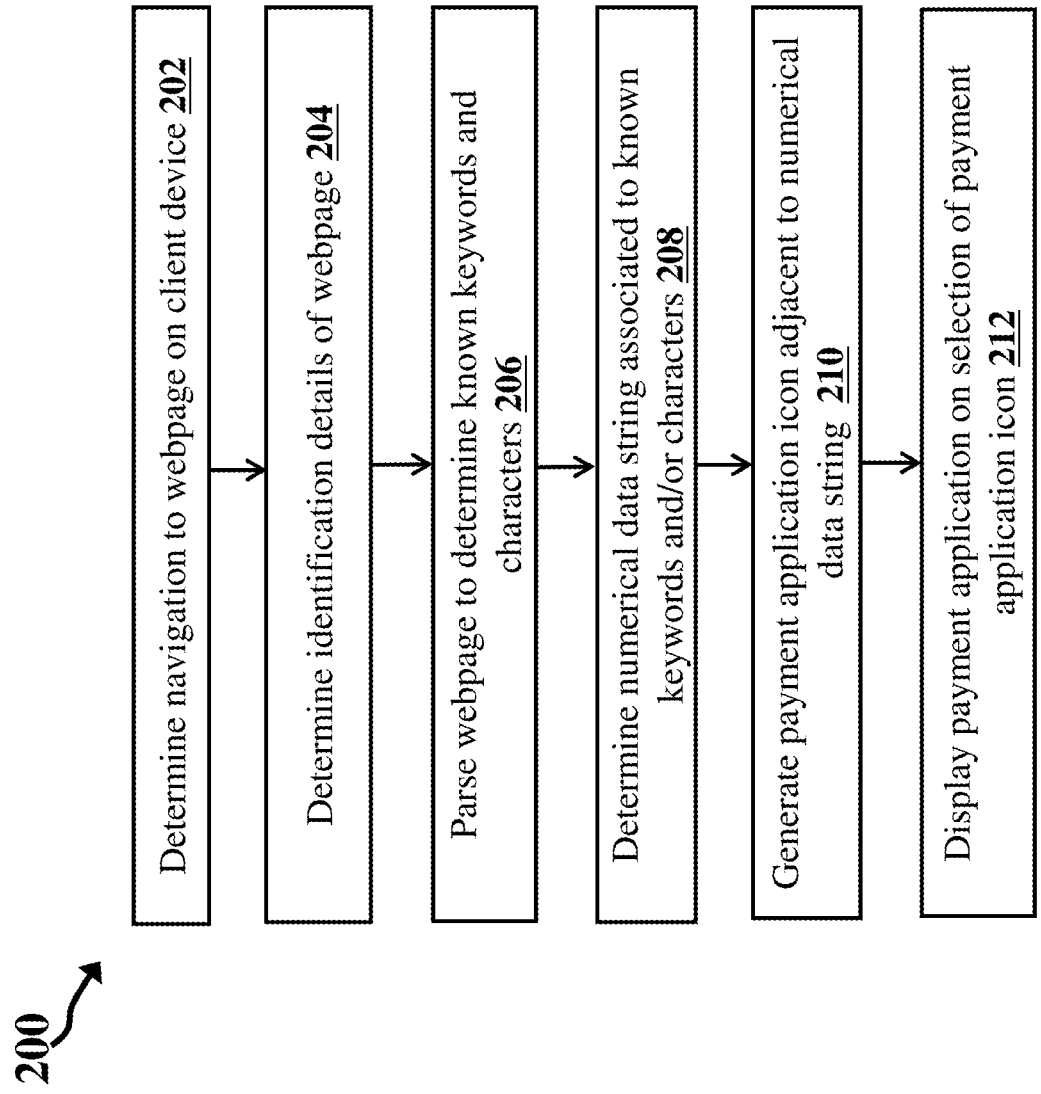
FIG. 2 is a flow diagram of an illustrative process for performing online payment transactions, according to an exemplary embodiment.

FIG. 2 shows execution steps for performing online payment transactions, according to a method 200. The method 200 shown in FIG. 2 comprises execution steps 202, 204, 206, 208, 210, and 212. However, other embodiments may comprise additional or alternative execution steps, or may omit one or more steps altogether. Other embodiments may perform certain execution steps in a different order; steps may also be performed simultaneously or near-simultaneously with one another. In addition, the method 200 of FIG. 2 is described as being executed by a single server computer, referred to as a client device in this exemplary embodiment. However, in some embodiments, steps may be executed by any number of computing devices operating in a distributed computing environment. In some cases, a computer executing one or more steps may be programmed to execute various other, unrelated features, where such computer does not need to be operating strictly as the client device described herein.

At step 202, user's client device communicates via a network(s) with various web sites. The communication may take any suitable form. For example, in some embodiments, the client device may execute a browser application having an application and/or an executable file that enables a user to navigate to the web site. It should be noted that the embodiments of the present disclosure are not limited to use with web sites accessible via a browser application. As such, the web sites may each include any site, which is accessible via the Internet. For instance, any one or more of web sites may not be a web site per se, but rather may comprise a mobile version of a site, or another form of site to which a user may navigate online. For example, a user may navigate to one or more of web sites by inputting a uniform resource locator (URL) into a browser application, for instance, by clicking on a link, automatically being taken there via an action initiated by another site and/or another application program.

When the user performs an activity on a browser application of the client device, the executable file may track the user activity and determine navigation to a web page of a web site on a browser application installed on the client device. Several techniques may be used by the executable file to track user's activities on the client device, such as by tracking browser cookies, IP addresses, screen scraping protocols, and information embedded in the uniform resource locator (URL) address. In one example, the executable file may track the user activity using IP address. In another example, the executable file may track the user activity by storing user's web browser cookies. For instance, the executable file may store the cookies as text strings on the user's client device local drive, and the cookies may be sent to a system server by the executable file for user session tracking. In yet another example, a webserver may also track a user using information embedded in a URL string on the browser of the client device. The webserver may implement the tracking process by appending a tracking or query string onto the URL string at the client device prior to sending the URL string to a browser. When a web browser accesses the content using the URL embedded with tracking information, the web browser sends the URL string back to a web server. By keeping track of the embedded information, the webserver may track user activities and then identify a web page the user is accessing.

At step 204, the executable file determines an identification of the web page being browsed on the client device by the user. The executable file obtains an identity of the user of the client device and an identification of the web page. The executable file may obtain the identity of the user of the client device by using a stored profile, cookies, IP address, request for input of an identification, or other identification method. The executable file may obtain the identification of the web page using a domain, URL, or other identification method.

In some configurations, the application (e.g., the executable file) may be running in the background of the client device. For instance, the application may be transparent to the user browsing different websites. In this way, the application is able to monitor the user's online activities without disturbing the user and/or disturbing the display screen of the client device. The application may remain in the background (e.g., transparent to the user) until and unless the application detects a payment.

At step 206, when a user is browsing on a web page on a client device, the executable file may be able to infer a payment transaction field on the web page by analyzing the web page. The identification of a payment transaction field by the executable file may take any of numerous forms. In one example, the executable file may monitor the web page displayed on the client device by periodically executing a data and/or screen scraping protocol, and identifying a set of characters and numerical data on the web page. The executable file may then match the identified set of characters (e.g., string of characters or keywords) with one or more pre-defined keyboards. Upon matching of the identified set of characters with the one or more pre-defined keyboards, the executable file may then confirm that the identified set of characters correspond to a payment transaction request. For example, the executable file may determine that the webpage displayed on the browser application represents a payment requests because at least one set of alphanumerical characters match a predetermined key word. The executable file may also determine a numerical data string associated with the payment transaction field.

In another example, the executable file installed on the client device may scan the pages of web page to which a user navigates, searching for characteristics, which signal the presence of a payment transaction field. Any of numerous types of page characteristics may indicate the presence of a payment transaction field. For example, the executable file may compare a page's content, URL, markup language tags, and/or any other suitable data to information such as at least one known keyword, which was previously identified as indicating the presence of a payment transaction field. For example, the executable file may compare the content of the web page to at least one known keyword previously stored in a system database to determine whether a payment transaction field is present on the page. The at least one known keyword may have one or more corresponding descriptors that define a transaction. The executable file may select at least one known keyword from a group consisting of total, subtotal, order total, product total, total amount, final amount, total balance, and current balance.

In yet another example, the executable file may identify a payment transaction field on the web page based at least in part on the location at which a payment transaction field is placed on a web page. For example, a location of a payment transaction field at a top right of a page or a top left of a page may be known to an executable filed based on identification details of the web page that the user is accessing since the executable file may have learned the location of the payment transaction field on the web page when the user previously accessed the web page for making any transactions.

In yet another example, the executable file identify a payment transaction field on the web page based at least in part on matching identification information and/or names of HTML elements identified on the web page against a set of known payment information related fields. The set of known payment information related fields may be selected from a group consisting of total, subtotal, order total, product total, total amount, final amount, total balance, and current balance. In yet another example, the executable file may identify a payment transaction field on the web page based at least in part on the location at which a payment transaction field is placed on a web page. For example, a location of a payment transaction field at a top right of a page or a top left of a page may be known to an executable filed based on identification details of the web page that the user is accessing since the executable file may have learned the location of the payment transaction field on the web page when the user previously accessed the web page for making any transactions.

In yet another example, the executable file may parse the web page to determine occurrence of one or more characters on the web page matching with one or more pre-defined characters to determine a payment transaction field on the web page. For instance, an executable file checks a web page for characters such a dollar sign ("$") and/or a decimal point ("."). The executable file upon determining a dollar sign ("$") and/or a decimal point (".") on the web page may confirm the presence of a payment transaction field on the web page. The executable file updates a list and possible location of known keywords and characters on one or more web sites accessed by the user and store the list in a system database.

At step 208, the executable file determines a numerical data string such as a payment amount value associated to the one or more identified characters and/or the at least one known identified keyword. For instance, the executable file may identify a payment amount value associated to the dollar sign ("$") and/or a decimal point ("."). In order to confirm that the payment amount value has to be transacted by the user, the executable file may check that there is presence of at least one known keyword selected from a group consisting of total, subtotal, order total, product total, total amount, final amount, total balance, and current balance adjacent to the payment amount value.

At step 210, upon identifying the payment transaction field and/or payment amount value requiring processing by the user, the executable file may query a server such as a payment server with a request containing identification details of the user, the client device, and/or the web page. The server, upon receiving the request from the executable file, may identify one or more accounts of the user with a payment bank associated with a payment server based on correlation of the personal details of the user, web page being browsed by the user, and payment amount value to be processed. The payment server may determine one or more accounts of the user with the payment bank to be transmitted to the executable file based on personal details of the user. The executable file on receiving the details of the one or more accounts from the payment server may generate a payment application icon (also referred to as a payment icon) adjacent to the numerical data string. In some embodiments, the executable file on receiving the details of the one or more accounts from the payment server may generate a payment application icon at any suitable location on the web page. In some embodiments, the executable file, in response to receiving the details of the one or more accounts from the payment server, may render (or otherwise display) a payment application icon on the web page. For instance, the executable file (e.g., application) may display the payment icon on the client device. In some configurations, the application may transmit an instruction to a webserver displaying the website on the client device and cause the webserver to display the payment icon.

A payment application icon may be a small graphic symbol that denotes programs, commands, data files, etc. in a web page on a graphical user interface of the client device. For example, a payment application icon can be used to launch a payment application. In some embodiments, a payment application icon may be a dynamic icon. For example, a payment application icon may be updated, changed, or animated. In some embodiments, a payment application icon may be associated with a payment application stored on a system database. Thus, a payment application may be developed that is designed for processing of payment transaction on a web page of any merchant accessed on a client device.

At step 212, an executable file displays a payment application icon on a web page being accessed on a client device. In response to receiving an indication that the user has interacted with the payment application icon, the executable file may then display a payment prompt having one or more payment data input fields associated with the user and an interactive hyperlink. The one or more payment data input fields are configured to receive payment data associated with an account of the user. The interactive hyperlink is configured to transmit a payment from an account of the user to a recipient identified within the webpage. For instance, a payment server associated with the user's account may transmit a payment to another account associated with the webpage, based on the payment information received from the user.

In some embodiments, the payment application icon is associated with a payment web site and can have an address of the payment web site associated therewith. The client device can receive information representing an update of the payment application icon and such information can be displayed in association with the payment application icon. If the payment application icon is selected by a user, a browser may be launched on a client device and the address of the payment web site may be passed to the browser as an input parameter. The browser can use the address of the payment web site to access the payment web site and display a page of content associated with the payment web site. The information can include a payment amount identified by the executable file to be paid by the user and/or a budget amount selected by the user.

In some embodiments, on selection of the payment application icon by the user, an executable file displays a payment application on a web page being accessed on a client device. The payment application may provide the user options to perform the transaction of the payment amount value using the one or more accounts of the user with a payment bank/company. The executable file may display a payment application on the web page as a pop-up window or any other visually perceptible format. The window can be displayed in front of the current web browser page.

In some embodiments, an executable file presents a payment application to be displayed on at least one portion of a browser. In some embodiments, the executable file interacts with the browser to display the payment application to the user. The examples of the portion of the browser may include a tag, message panel, curtain, a drop-down list, a dialogue box, a tool bar, a sidebar, and any other available space on the browser. Further, the executable file may display a payment application in a pre-defined format. The examples of the pre-defined format may include tagging a payment amount value, highlighting the payment amount value with a border, and indicating the one or more accounts with an icon such as an arrow. In some embodiments, the payment application only displays a payment amount identified by the executable file to be paid by the user. In some embodiments, the payment application displays a budget amount selected by the user, and stored in a user profile associated to the payment company/bank.

Figure 3:
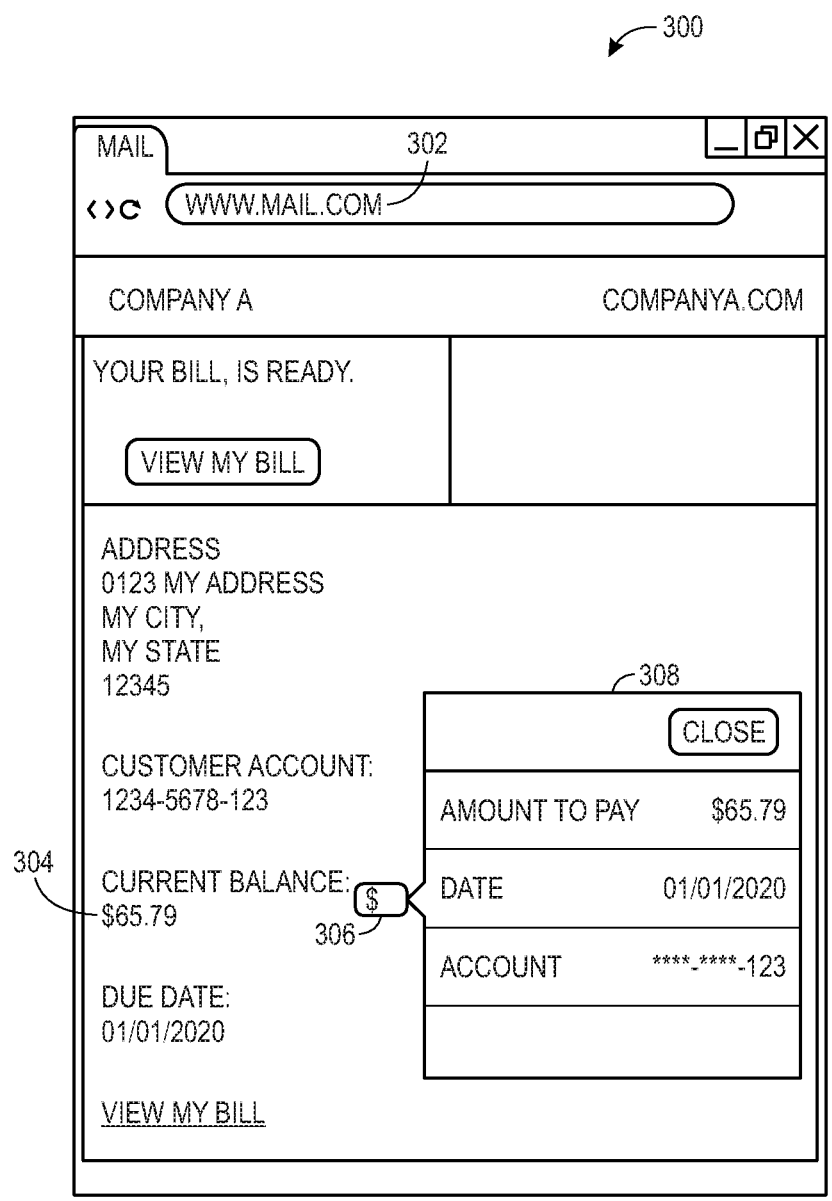
FIG. 3 illustrates a graphical user interface (GUI) for presenting a conversational view for assisting users to perform online payment transactions while browsing email, according to an exemplary embodiment.

FIG. 3 illustrates a graphical user interface (GUI) 300 for presenting a window for assisting users to perform online payment transactions while browsing email, according to an exemplary embodiment. A user of a client device having an HTML-compatible browser can retrieve a web page (an HTML formatted document) of a web site by specifying a link via the URL. Upon such specification, a client device makes a transmission control protocol/Internet protocol (TCP/IP) request to a web server identified in the URL link and receives the web page in return. In one example case, when a user browses an email web site 302 (for example, Gmail or any other email web site) on a web browser of a client device, a client device monitors the user's web interactions. For instance, when a user browses an email web site 302, an executable file installed on a web browser may employ one of the several techniques to track user activity on the web browser. The techniques may include, but not limited to, tracking browser cookies, IP addresses, and information embedded in the uniform resource locator (URL) address. For instance, an executable file may track user activity on the client device by using information embedded in a URL string for an email web site 302 by the user.

A user may access one or more emails on an email web site 302 and open one of the electronic mails, for example, related to a merchant invoice. The executable file upon determining that the merchant email web page is being viewed by the user on the client device, the executable file may analyze and/or parse the web page that displays the merchant email. The executable file may parse the web page to determine at least one known keyword and/or character on the web page displaying the merchant email. The at least one known keyword may include words such as total, subtotal, order total, product total, total amount, final amount, total balance, and current balance. The characters may include but not limited to a dollar sign ("$") and/or a decimal point ("."). It is to be noted that the executable file parses all web pages opened by the user on the web browser at all times to identify any known keywords and/or characters on the web page without limiting the scope of the disclosed embodiments.

On identification of the keyword ("current balance" is identified) and characters (dollar sign ("$") and a decimal point (".") are identified) on the web page, the executable file determines a payment value (65.79) 304 associated to the identified keyword and character. To determine the payment value 304, the executable file may use a web scraping technique. The executable file then generates a payment application icon (not shown) 306 adjacent to the payment value 304. In some embodiments, the executable file may generate a payment application icon 306 on any location on a web page. In some embodiments, the executable file may generate a payment application icon 306 on a web browser or a toolbar of a web browser. In some embodiments, the executable file may generate a payment application icon 306 on any location of a display screen of a client device where the user is accessing electronic mails on the email web site 302.

The payment application icon 306 represents a payment web site of a payment company where a user has an account. In some embodiments, the executable file temporarily generates a payment application icon 306 on any location on the web page currently being accessed by a user. For instance, the executable file temporarily generates a payment application icon 306 on any location on the web page for a period of time the web page is displayed on the client device. In some cases, the payment application icon 306 is temporarily generated on a web page of merchant invoice mail such that when a user forwards or replies to the merchant invoice mail on which the payment application icon 306 is generated, the payment application icon 306 is not included in the forwarded or replied email. In some cases, the payment application icon 306 is temporarily generated on a web page of merchant invoice mail such that the payment application icon 306 may not be included in a print or scanned copy of the web page on which the payment application icon 306 is generated.

The executable file upon selection of the payment application icon 306 on the web page opened on the client device presents a payment application 308 in a pop-up window, a new window, a drop-down menu, or other presentation on the web page opened on the client device. For instance, when the user hovers, click, or otherwise interacts with the payment application icon 306, the executable file (e.g., the application executing on the client device and connected with the system server) displays the payment application 308. The payment application 308 viewable to the user may include one or more fields relates to "amount to pay," "date," and "account." The executable file may pre-fill a field of "amount to pay" with a payment value (65.79) identified by the executable file. A user may submit details in remaining fields, and perform a payment transaction via the payment application 308 on the web page opened on the client device without moving out of the web page opened on the client device or logging into a web site of a payment company. The payment application 308 may include one or more input fields configured to receive payment information associated with the user (e.g., payment card number, expiration date, and the like). In some configurations, the server and/or the application executing on the client device may pre-populate one or more input fields using data retrieved from the system database (e.g., user profile).

In another example, the analytics server may retrieve and display dynamic payment authentication data and display such data in the payment application 308. A dynamic payment authentication data, as used herein, refers to any dynamic data that is needed to authenticate the user or otherwise authorize the payment. For instance, traditionally CVV numbers of payment cards were printed on the payment cards themselves. However, in order to increase payment security, some CVV numbers (or any other data needed to complete the payment) may be dynamically changes. For instance, a payment server associated with the user's payment card may use a pre-determined time algorithm to rotate through various combinations of CVV numbers and/or randomly generated values produced by a cryptographic algorithm. In operation, the CVV number for a payment card may differ based on a time of payment. In order to use the payment card, the user may then be required to log in an application or a website, and retrieve the CVV number appropriate for the time of payment.

In those embodiments, the application executing on the client device may retrieve the dynamic CVV number and present the dynamic CVV number to the user. In this way, the user is no longer required to separately retrieve the CVV number. In some configurations, the application may use an additional authentication method provided by the mobile device before retrieving the dynamic CVV number. For example, the application may require the user to provide authentication data and use the authentication data to retrieve the payment card's dynamic CVV number. For instance, the application may require the user to input a biometric-based authentication input (e.g., fingerprint, facial picture, and the like) and use the biometric-based authentication input to retrieve the user's dynamic CVV.

In some configurations, retrieving the dynamic CVV number may be accomplished using an application programming interface (API) module that automatically queries and retrieves the dynamic CVV number from the appropriate electronic data sources (e.g., databases associated with the user's payment card).

Figure 4:
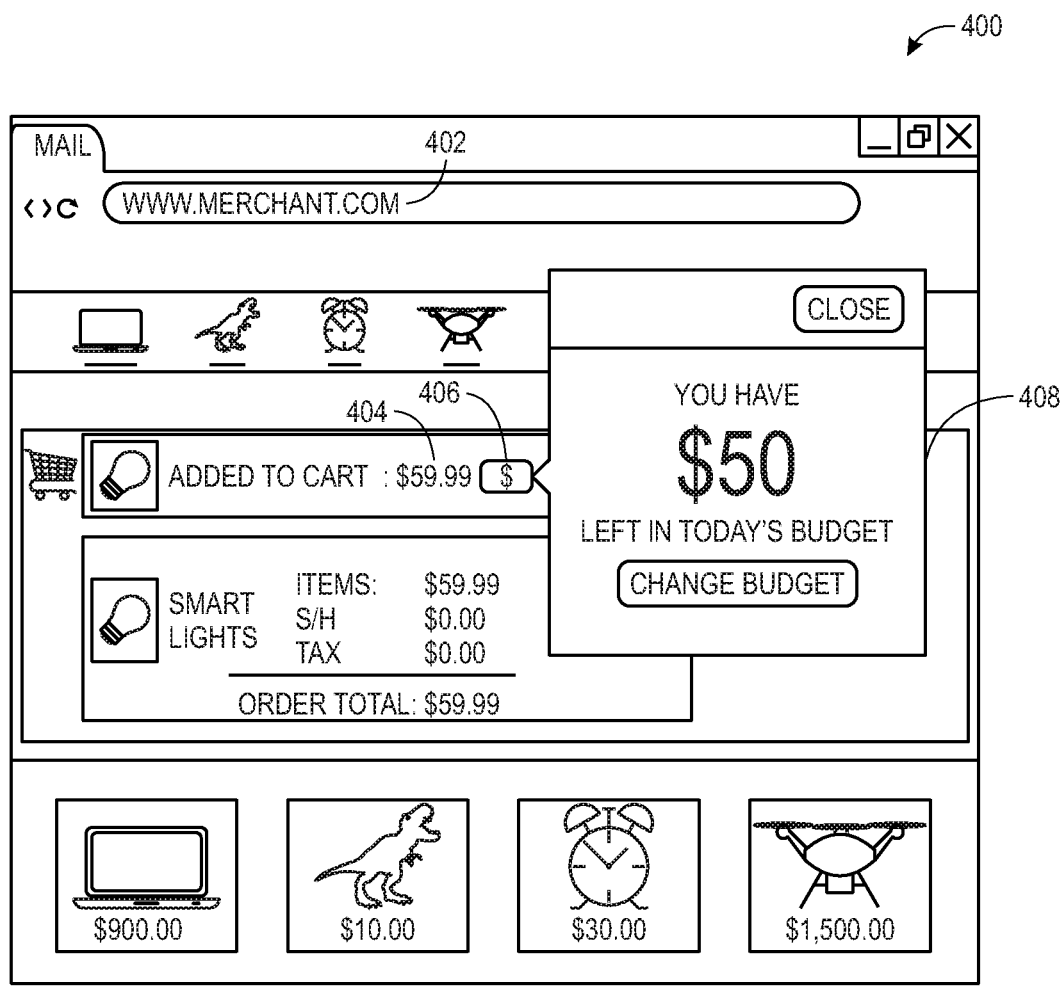
FIG. 4 illustrates a graphical user interface (GUI) for presenting a conversational view for assisting users to perform online payment transactions while shopping online, according to an exemplary embodiment.

FIG. 4 illustrates a graphical user interface (GUI) 400 for presenting a conversational view for assisting users to perform online payment transactions while shopping online, according to an exemplary embodiment. A user of a client device having an HTML-compatible browser can retrieve a web page (an HTML formatted document) of a web site by specifying a link via the URL. Upon such specification, the client device makes a transmission control protocol/Internet protocol (TCP/IP) request to a web server identified in the URL link and receives the web page in return. For instance, when a user browses a merchant web site 402 on a web browser of a client device, a client device monitors user interactions with the WWW. For instance, when a user browses the merchant web site 402, an executable file installed on a web browser may employ one of the several techniques to track user activity on the web browser. The techniques may include, but not limited to, tracking browser cookies, IP addresses, and information embedded in the uniform resource locator (URL) address. For instance, an executable file may track user activity on the client device by using information embedded in a URL string for the merchant web site 402 by the user.

A user may shop for one or more items on the merchant web site 402 and add the one or more information in a cart for purchase. At the same time, when the user is selecting items for purchase on a web page of the merchant web site 402, an executable file may be parsing the web page. The parsing may be performed to determine at least one known keyword and/or character on the merchant web page. The at least one known keyword may include words such as total, subtotal, order total, product total, total amount, final amount, total balance, and current balance. The characters may include but not limited to a dollar sign ("$") and/or a decimal point ("."). It is to be noted that the executable file parses all web pages opened by the user on the web browser at all times to identify any known keywords and/or characters on the web page without limiting the scope of the disclosed embodiments.

On identification of the keyword ("subtotal" is identified) and characters (dollar sign ("$") and a decimal point (".") are identified) on the web page, the executable file determines a payment value (59.99) 404 associated to the identified keyword and character. To determine the payment value 404, the executable file may use a web scraping technique. The executable file then generates a payment application icon 406 adjacent to the payment value 404. The payment application icon 406 represents a payment web site of a payment company where a user has an account. On selection of the payment application icon 406 on the web page opened on the client device, the executable file presents a payment application 408 in a pop-up window, a new window, a drop-down menu, or other presentation on the web page opened on the client device. The payment application 408 viewable to the user may indicate user budget. A user may select a budget for each day and/or for a particular web site and store in a user profile accessible to an executable file. The executable file may compare records of the user profile with identification details of a web site user is viewing, and determine any recommendations and/or message that has to be transmitted to the user via the payment application 408.

A budget may be defined by a user to estimate spending associated with a time period, such as a week, month, year, etc., and/or may be specific to one or more web sites and/or merchant categories. In some embodiments, a server may calculate a budget for a user based on information contained in a user profile, and then provide a budget recommendation to the user via one or more communication techniques described above. The server may process information associated with the user such as user income, spending power, age, education, and other demographic data. In some embodiments, a user may request a server to generate a budget for the user. For example, a server may receive a user request to establish a budget for the user. The server may then assist the user in generating a budget by establishing a budget period, one or more income streams of the user, and/or one or more expenses, such as expenses paid to various recipients by the user.

In some embodiments, the server may interact with a bank server in order to collect or obtain information associated with one or more recipients of the user. For example, information associated with one or more recipients for the user may be obtained, which the server may use to assist the user in preparing the requested budget. The server may identify recipients and/or probable recipients for the user to additionally propose budget amounts after taking into consideration various recipients. Once a budget has been generated for a user, the server may assist the user in the management and/or modification of the budget. For example, the server may assist the user in tracking expenses in order to determine whether the user is living within his/her means and/or achieving any number of desired saving goals (e.g., savings goals). Additionally, the server may interact with the bank servers in order to collect payment history information associated with one or more new recipients. Based at least in part on the collected information, the server may generate one or more proposed modifications to the budget, such as proposals for revising budgeted amounts.

In a non-limiting example, the server may receive a user request to establish a budget for the user. The server may then retrieve a user profile from a system database. The user profile may contain information associated with the user, such as but not limited to user income, user spending, user desired saving goals, user payment history, user billing information, user family information, and user's residence information. In some cases, all the information associated with the user may not be stored in a system database, and in such a case, a server may request a user and/or external servers to provide all necessary information corresponding to the user. In some cases, a server after retrieving information such as user income, user spending, user desired saving goals, user payment history information, user billing information, user family information, user residence information for a given user from a system database, the server may then interact with the user to ensure that the retrieved information is correct and updated.

After the user profile and information contained in the user profiles has been obtained by the server, the server may query a system database or any external database to identify users having a similar profile. In some instances, a server may query a system database or any external database to identify users having at least one profile feature, which is similar to a profile feature of the user determined by the user using information contained in the user profile. The similar feature may include, but not limited to, income, salary, expenses, shopping patterns, etc. The server upon identifying similar users may then determine a budget associated to the identified similar users. The server may then sent the budget associated to the identified similar users to the user.

In some cases, the server may also provide a budget recommendation to the user based on the budget associated to the identified similar users.

In some embodiments, when a user proceeds to purchase one or more items on the merchant web site 402, and when a user has also indicated a shared budget for the merchant web site 402 with a second user, then a server before finalizing the purchase of the one or more items of the user may transmit a notification to a computing device of a second user regarding the purchase request of the user. The notification may be displayed on a GUI of the computing device of the second user, and may include information associated the cost of one or more items, total value of shared budget of the user and the second user, and remaining value in the shared budget of the user and the second user. A second user may then approve or decline the purchase request. The server upon receiving the approval from the computing device of the second user may then approve the purchase of the one or more items. The server upon receiving the decline conformation from the computing device of the second user may then notify the user that the second user has declined the request to purchase the one or more items. In such instances, the server may allow the user to purchase the one or more items from a new account, which may not be linked to any shared budget with the second user or any other user.

In a non-limiting example, when determining that a first user is transmitting a payment using the client device, the application executing on the client device may transmit a notification (e.g., a push notification, text message, and the like) to a second electronic device. The notification may include the payment information (e.g., amount of the transaction, time, budget, and the like). In some embodiments, the application may not allow the first user to transit the payment until and unless the application has received authorization from the second electronic device. For instance, when a child is transmitting a payment, the server may send a push notification to the child's parent's mobile device to authorize the payment. The server may also perform this process for payments that satisfy a budget criteria (e.g., payment that are more than a pre-determined budget or payments that are more than a predetermined amount).

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed is:

1. A computer-implemented method executed by at least one processor, the method comprising:
   monitoring, by an application executing on a client device, a webpage displayed on a browser application of the client device by periodically executing a data scraping protocol, wherein the application is executed in a background while a user is operating the browser application of the client device;
   determining, by the application, that the webpage displays a set of keywords associated with a payment transaction;
   in response to determining that the webpage displays the set of keywords associated with the payment transaction, dynamically rendering, by the application, a payment icon on the webpage in the browser application associated with a payment company or bank at which the user has an account; and
   in response to receiving an indication that the user has interacted with the payment icon:
      displaying, by the application, a payment prompt comprising one or more payment data input fields associated with the user, one or more authentication data input fields, and an interactive hyperlink configured to cause a payment server to transmit a payment from the account of the user to a recipient identified within the webpage;
      pre-filling, by the application, the one or more payment data input fields with payment data associated with the payment transaction, the account of the user, or both;
      receiving, by the application, biometric authentication data;
      authenticating, by the application, the user using the biometric authentication data;
      in response to authenticating the user, pre-populating, by the application, the one or more authentication data input fields with dynamic payment authentication data, wherein the dynamic payment authentication data is dynamically changed over pre-determined time periods;
      receiving, by the application, an indication to cause the payment server to transmit the payment from the account of the user to the recipient via the interactive hyperlink;
      authenticating, by the application, the dynamic payment authentication data; and
      in response to authenticating the dynamic payment authentication data, causing, by the application, the payment server to transmit the payment from the account of the user to the recipient, whereby the payment server transmits the payment from the account of the user to another account associated with the webpage based on payment data.

2. The computer-implemented method of claim 1, comprising, in response to receiving an indication that the user has interacted with the payment icon, displaying, by the application, one or more items on the payment prompt, wherein the application determines the one or more items based on a user profile containing data corresponding to the webpage.

3. The computer-implemented method of claim 2, wherein the one or more items comprises a budget amount, a list of previously purchased products, a list of recommended products, a list of membership points, and a list of reward purchase options.

4. The computer-implemented method of claim 1, comprising, in response to receiving an indication that the user has interacted with the payment icon, displaying, by the application, a numerical data string on the payment prompt for payment of value within the one or more payment data input fields.

5. The computer-implemented method of claim 2, comprising, in response to receiving an indication that the user has interacted with the payment icon, displaying, by the application, the payment prompt on the webpage as a pop-up window, a new window, or in any visually perceptible format.

6. The computer-implemented method of claim 1, wherein the set of keywords comprises a decimal point, dollar sign, or both.

7. The computer-implemented method of claim 1, wherein the set of keywords corresponds to descriptors that define a transaction.

8. The computer-implemented method of claim 1, wherein the set of keywords comprises "total", "subtotal", "order total", "product total", "total amount", "final amount", "total balance", and "current balance".

9. The computer-implemented method of claim 1, comprising determining, by the application, the webpage on the client device by tracking one or more of browser cookies, IP addresses, and information embedded in a uniform resource locator (URL) address.

10. The computer-implemented method of claim 1, comprising utilizing, by the application, web crawlers to crawl various web sites associated with user membership accounts to retrieve identification data of the various web sites.

11. A system comprising:
   a server configured to manage an account of a user; and
   a client device communicatively coupled to the server, the client device configured to execute an application configured to:
      monitor a webpage displayed on a browser application of the client device by periodically executing a data scraping protocol, wherein the application is executed in a background while the user is operating the browser application of the client device;
      determine, by the application, that the webpage displays a set of keywords associated with a payment transaction;
      in response to determining that the webpage displays the set of keywords associated with a payment transaction, dynamically render a payment icon on the webpage in the browser application; and
      in response to receiving an indication that the user has interacted with the payment icon:
         display a payment prompt comprising one or more payment data input fields associated with the user, the one or more payment data input fields configured to receive payment data associated with the account of the user, one or more authentication data input fields, and an interactive hyperlink configured to cause a payment server to transmit a payment from the account of the user to a recipient identified within the webpage, whereby the payment server transmits the payment from the account of the user to another account associated with the webpage based on payment data;

pre-fill, by the application, the one or more payment data input fields with payment data associated with the payment transaction, the account of the user, or both;

pre-populate, by the application, the one or more authentication data input fields with dynamic payment authentication data, wherein the dynamic payment authentication data is dynamically changed over pre-determined time periods by providing different combinations of the dynamic payment authentication data based on a pre-determined time algorithm, randomly generating the dynamic payment authentication data via a cryptographic algorithm, or both;

receive, by the application, an indication to cause the payment server to transmit the payment from the account of the user to the recipient via the interactive hyperlink;

authenticate, by the application, the dynamic payment authentication data; and in response to authenticating the dynamic payment authentication data, cause, by the application, the payment server to transmit the payment from the account of the user to the recipient, whereby the payment server transmits the payment from the account of the user to another account associated with the webpage based on payment data.

12. The system of claim 11, wherein the application is configured to display, in response to receiving an indication that the user has interacted with the payment icon, one or more items on the payment prompt, wherein the application determines the one or more items based on a user profile containing data corresponding to the webpage.

13. The system of claim 12, wherein the one or more items comprises a budget amount, a list of previously purchased products, a list of recommended products, a list of membership points, and a list of reward purchase options.

14. The system of claim 11, wherein the application is configured to display, in response to receiving an indication that the user has interacted with the payment icon, a numerical data string on the payment prompt for payment of value within the one or more payment data input fields.

15. The system of claim 12, wherein the application is configured to display, in response to receiving an indication that the user has interacted with the payment icon, the payment prompt on the webpage as a pop-up window, a new window, or in any visually perceptible format.

16. The system of claim 11, wherein set of keywords comprises a decimal point, a dollar sign, or both.

17. The system of claim 11, wherein the application is configured to determine the webpage on the client device by tracking one or more of browser cookies, IP addresses, and information embedded in a uniform resource locator (URL) address.

18. The system of claim 11, wherein the application is configured to utilize web crawlers to crawl various web sites associated with user membership accounts to retrieve identification data of the various web sites.

19. The computer-implemented method of claim 1, comprising, in response to authenticating the dynamic payment authentication data, determining that the user has a shared budget with a second user, and transmitting, by the application, a notification to a computing device associated with the second user regarding the payment.

20. The system of claim 13, wherein the server is configured to determine the budget amount based on the user's income information, spending power, age, education, or any combination thereof.

* * * * *